2,887,765
SINTERED POWDERED COPPER BASE BEARING

Robert F. Thomson, Grosse Pointe Woods, and Eric W. Weinman, Birmingham, Mich., assignors to General Motors Corporation, Detroit, Mich., a corporation of Delaware No Drawing. Application July 19, 1954
Serial No. 444,401

5 Claims. (Cl. 29—182)

This invention relates to sintered powdered metal bearings having a high degree of wear resistance with or without subsequent cold or hot working or thermal treatment. More particularly, the invention pertains to sintered powdered copper base bearing parts containing tin and dispersed particles of titanium-aluminum alloy.

Porous metal bearings commonly have been employed in industry during recent years, but their use in many applications has been limited because of their relatively low wear resistance. Accordingly, a principal object of this invention is to provide a novel sintered powdered copper base bearing having a high degree of wear resistance due to the presence of titanium-aluminum alloy particles. A further object of the present invention is to provide a simple, inexpensive process for forming a sintered powdered copper base bearing of such a composition having close dimensional tolerances.

These and other objects are attained in accordance with our invention by the addition of a powdered alloy of titanium and aluminum to copper base metal powder. Small proportions of tin and nickel powders are also preferably included in the powdered metal mix and serve to provide the material with greater corrosion resistance, ability to age harden, wear resistance and strength. The formed bearing part, when sintered, or when sintered and worked to a controlled degree of porosity, possesses excellent wear resistance properties due to the presence of dispersed titanium-aluminum particles. Such particles are introduced in the form of a pulverized intermediate alloy, as will be hereinafter more fully explained.

The resultant wear-resistant sintered powdered copper base metal may be advantageously used to form piston pin bushings, camshaft bushings, balancer shaft bushings, thrust washers and other bearing parts. Likewise friction materials, such as are used in clutch plates and the like, may be formed of this sintered copper base metal. Hence the word "bearing," as used herein, is intended to include all such applications in which relatively moving parts are in engagement and in which high wear and score resistance of the metal is desirable.

Sintered powdered copper base bearings formed in accordance with the present invention possess not only the aforementioned high wear resistance but also desirable oil-retaining properties. Moreover, these bearings, when compared with similar parts made by normal manufacturing methods, do not require the expensive machining operations otherwise frequently necessary to provide the proper tolerances. In turn, since little or no machining is necessary, scrap or waste is reduced to a minimum.

Other objects and advantages will more fully appear from the following detailed description of preferred embodiments of our invention.

The bearing part is initially formed by thoroughly mixing a finely pulverized alloy of titanium-aluminum with a copper base powder containing tin. The tin may be alloyed with the copper, although normally it is separately added to the mix in powdered form. Other elements, such as zinc, nickel, lead, manganese, aluminum, silicon, beryllium, cobalt, iron and phosphorus, may also be included in the bearing material. Most of these elements normally are wholly or partially alloyed with the copper. Zinc, nickel, lead and aluminum may be present in appreciable amounts and may be beneficial for particular purposes. Hence the zinc and lead contents of the copper base bearing may range as high as 45% and 30%, respectively. Likewise, up to about 15% aluminum may be included in the powdered metal mixture, a 2% to 11% aluminum content being preferred for some applications. Nickel may be present in very large quantities, as hereinafter more fully explained. Amounts of silicon and iron, preferably in the order of about 1% to 3% and 1% to 11%, respectively, may also be present. The various other elements listed above are normally present in only very small quantities.

Even relatively minute amounts of the titanium-aluminum alloy powder improve wear resistance to a measurable extent; and the ranges of this constituent may vary from small but effective amounts to quantities constituting approximately 25% by weight of the final mix. However, in order to provide the desired economy and strength, particularly impact strength and shock resistance, the titanium-aluminum normally should be maintained between 0.5% and 12% by weight, although these properties are present to a satisfactory extent when the titanium-aluminum constitutes as much as about 20% of the powdered metal mix. When more than 25% titanium-aluminum is used, the strength and ductility of the sintered powdered copper base bearing are appreciably reduced. The excessive brittleness of such a bearing, which precludes its effective use in most applications, is evidenced by chipping or cracking of wear test specimens when they are being ground. Optimum properties are usually obtained when the bearing contains approximately 1% to 10% of the pulverized alloy of titanium-aluminum.

Finely divided graphite, preferably 80 mesh or finer, may be mixed with the metal powder to increase tool or die life and to improve frictional characteristics of the formed copper base bearing part. Small amounts of graphite not in excess of approximately 6.5% are satisfactory, while a graphite content between about 0.3% and 4% is normally preferred.

Likewise, in order to eliminate the necessity of coating the dies with a lubricant during the briquetting operation, a small but effective amount of zinc stearate powder not in excess of about 2.5% should also be included in the powdered metal mix. In general, we have found that best results are obtained with a mix having a zinc stearate content between approximately 0.3% and 2%. Other die lubricants, such as stearic acid in powder form, can also be used in place of the zinc stearate.

The inclusion of proper amounts of tin and nickel in the powdered metal mix further increases the wear resistance and score resistance of the formed bearing part. Moreover, nickel also contributes corrosion resistance to the bearing and improves its ability to age harden. Tin melts at a low temperature and alloys with copper to form a tin-copper alloy, the latter coating the substantially pure copper particles. During the sintering operation, the elevated temperature causes the tin to diffuse through the copper. The melting point of the metal in the areas previously occupied by the tin is thus raised, thereby providing an alloy having a melting point above the sintering temperature. Since the tin brazes the copper particles together to form a bronze, the resultant metal is a better bearing material than if no tin were present and possesses better corrosion resistance. Furthermore, the tin and nickel, if included in the powdered metal mix, serve to strengthen the bearing.

Although amounts of tin as high as 18% by weight may be used, optimum results are obtained with a preferred tin content between approximately 1% and 13%. The addition of tin in quantities greater than 18% results in the formation of hard and brittle copper-tin compounds, which tend to produce galling. Alternatively, a bronze powder of similar composition may be employed. The preferred nickel range is between 2% and 15%, although this element may be substituted for copper in amounts ranging from a small but effective amount up to the point where the copper content is only slightly higher than the nickel content. In no instance, therefore, would the added nickel content exceed about 49% in this copper base bearing material.

In view of the above considerations, we have found that a sintered powdered bearing having excellent wear and score resistance is one which comprises approximately 1% to 10% titanium-aluminum alloy, 0.3% to 4% carbon, tin not in excess of 13%, and the balance substantially all powdered copper. The inclusion of nickel in amounts not in excess of 15% increases the corrosion resistance of the bearing and permits it to be age hardened.

We have obtained best results when the copper constitutes between about 70% and 97% of the total mix. However, it will be understood that the terms "copper base metal," "copper base bearing" and "copper base alloy," as used herein, are intended to encompass mixtures and copper alloys in which copper is the major constituent in the powdered metal mixture and preferably constitutes at least 50% of such a mixture.

The tin powder may be added in the form of tin dust, while the nickel may be introduced as nickel powder, such as electrolytic nickel powder or nickel produced from nickel carbonyl by means of the Mond process or other suitable means. Although nickel may also be used in other forms, it is desirable to add it in the form of nickel powder formed from nickel carbonyl as its commercially available fine particle size permits quicker homogenization. Electrolytic nickel powder, as commercially supplied, is somewhat coarser grained, and its use necessitates a longer period of time at an elevated temperature to sufficiently homogenize the powder metal mix.

Among the pulverized titanium-aluminum intermediate alloys which may be used, those containing approximately 30% to 90% titanium and 10% to 70% aluminum result in the production of a sintered powdered copper base bearing having satisfactory wear resistance. For best results, however, a preferred pre-alloy comprising between 30% and 60% aluminum and 40% to 70% titanium is preferred. If the aluminum content of the titanium-aluminum alloy is excessive, the aluminum becomes molten at the sintering temperature, and partial loss of the titanium-aluminum alloy results.

It will be noted that it is necessary to form particles of titanium-aluminum in order to obtain high wear and score resistance in accordance with the invention. Merely adding titanium and aluminum separately, even if these constituents are added in the aforementioned preferred proportions, normally does not form these particles. It is the alloy of titanium and aluminum, rather than the individual elements, which contributes the desirable properties of wear and score resistance to the sintered powdered copper base bearing. Approximately —100 to —400 mesh titanium-aluminum powder is conveniently and preferably employed. Titanium-aluminum particles which are too coarse are somewhat prone to cause scoring.

We have found that the intermediate alloy of titanium and aluminum may be formed by preparing a charge of the desired percentages of titanium sponge and aluminum pig, such as commercially available 2S aluminum, the pre-alloy then being pulverized and added to the powdered copper base metal mix. The intermediate alloy mix may also contain small amounts of other metals, such as iron, manganese, silicon, chromium, magnesium and nickel. Normally the approximate maximum quantity of these metals will not exceed 6% manganese, 3% iron, 2% silicon, 1% chromium, 1% magnesium and 0.5% nickel. When converted to percentages of the final sintered bearing, the above manganese and silicon contents, for example, constitute only about 0.9% and 0.3%, respectively. The above percentages of the minor constituents are not critical in most instances, however, and are listed as examples only.

The titanium and aluminum are preferably placed in a graphite crucible, covered, and heated to a temperature between about 2700° F. and 2950° F. Inasmuch as titanium is a readily oxidizable and nitridable element, it is desirable to use an inert atmosphere, such as argon, as the melting atmosphere. The formed titanium-aluminum alloy, which solidifies at approximately 2450° F., may be cooled to room temperature in the crucible. If the titanium-aluminum is to be poured from the crucible, this is preferably done while the temperature of the alloy is between 2500° F. and 2700° F. Cooling and pouring also should take place under an inert atmosphere, the metal preferably being cast under an argon atmosphere as pigs in chilled molds.

Intermetallic compounds, such as TiAl and TiAl$_3$, are thus formed, and when pulverized and added to the copper base powder, greatly improve the wear resistance of the final sintered product. Mixtures of these titanium-aluminum compounds frequently result, and some of the titanium and aluminum may also be present in the form of a solid solution of titanium and aluminum. Regardless of the exact form in which the titanium-aluminum particles are present in the powdered metal, their presence greatly improves the wear and score resistance of the sintered powdered copper base bearing.

Commercially pure copper and tin may be used or, as hereinbefore explained, a bronze powder of appropriate composition may be used in place of the mixture of copper and tin. Hydrogen reduced copper of approximately —150 mesh has provided excellent results, although the particle size of the copper or bronze may vary from —60 to —325 mesh and still produce a satisfactory bearing.

The sintered powdered copper base bearing may be formed by first briquetting a mixture of the pulverized titanium-aluminum alloy, tin, nickel and copper, together with zinc stearate and graphite powder, if it is desired to add the latter constituents, at appropriate pressure in a die having a contour which is complementary to the bearing surface to be formed. Although a briquetting pressure between approximately 20,000 and 120,000 pounds per square inch has proved to be satisfactory, 40,000 to 60,000 pounds per square inch appears to be the optimum pressure range for most applications. Before briquetting, it is important that the powdered metal constituents be thoroughly mixed in order to provide uniformity of structure and properties to the resultant bearing.

The green briquette is then sintered under suitable conditions of time, temperature and atmosphere into a structure having a controlled degree of porosity. Sintering temperatures between 1300° F. and 1950° F. and sintering times between fifteen and thirty minutes appear to be highly satisfactory for these powdered copper base briquettes. The above sintering times are not critical, however, and sintering times as short as four minutes and as long as two hours produce satisfactory wear test results. Excellent results have been obtained by sintering the briquette at approximately 1500° F. for twenty minutes under a non-oxidizing furnace atmosphere, such as dissociated ammonia, dry "Drycolene" gas, or a gaseous mixture of "Neutralene" and a small amount of natural gas.

It is convenient to prepare "Drycolene" by burning one part of natural gas with approximately ten parts of air, condensing the water vapors, passing the gas through hot charcoal and drying it in activated alumina. The dry Drycolene gas thus is composed of approximately 20% carbon monoxide, 3% hydrogen and 77% nitrogen. The Neutralene atmosphere mentioned above is a closely related gaseous mixture which usually consists of approximately 1.5% carbon monoxide, 1.5% hydrogen and 97% nitrogen. It has proved advantageous to use a mixture of 100 parts of Neutralene and one part of natural gas. Of course, other furnace atmospheres, such as hydrogen, mixtures of nitrogen and hydrogen or methane, etc., can be used, but Drycolene and Neutralene are readily available and each provides a highly effective protective atmosphere.

If an appreciable amount of nickel has been separately included in the powder metal mix, heat treatment subsequent to sintering is beneficial. Thus a solution treatment for one to eight hours in a non-oxidizing atmosphere at a temperature between approximately 600° F. and 1400° F. may be used to provide greater hardness and homogeneity. A two-step process is preferably employed, however, such as an initial heat treatment for five hours in a non-oxidizing atmosphere at 1400° F. follower by a water or oil quench and a low-temperature heat treatment or aging in a similar atmosphere for five hours at 600° F. The bearing may also be beneficially aged at room temperature following the solution step.

It will be understood that the sintered powdered copper base bearing containing dispersed particles of titanium-aluminum may be manufactured under the usual porous metal techniques as disclosed in a number of patents, such as Patents Nos. 1,738,163, 2,097,671, 2,075,444, etc. Also, instead of briquetting the metal powder as hereinbefore explained, it may be molded to shape prior to sintering as suggested in Koehring Patent No. 2,198,702.

Likewise, the powdered metal mix may be merely spread on or otherwise placed in contact with a supporting surface and subsequently sintered. This supporting surface may be a non-porous metal backing strip, such as a steel strip, and the powdered metal may be bonded to the back on sintering. When this latter procedure is used, it may be desirable to first electrodeposit a suitable metal plate on the surface of the back to improve the strength of the bond. This type of process is disclosed in Koehring Patents Nos. 2,187,086 and 2,198,-253. After sintering, the composite of spongy copper base alloy on the back may be rolled to increase the density of the powdered metal bearing and then resintered or annealed. Additional rolling and annealing treatments can be employed to further increase the density of the bearing. In this manner a highly wear-resistant sintered bronze bearing layer, for example, can be formed on a steel back.

All of the above modifications are understood to be within the scope of the present invention, which broadly comprehends the provision of a sintered powdered copper-base bearing part containing tin and/or nickel and dispersed particles of a titanium-aluminum alloy.

Wear and score test apparatus were employed to compare sintered copper-base metal samples formed in accordance with our invention with sintered copper-base samples containing no titanium-aluminum particles. These samples were prepared as tensile bars briquetted at a pressure of 60,000 pounds per square inch. They were then sintered for 25 minutes in a dissociated ammonia atmosphere at a temperature of 1575° F. and subsequently cooled in this atmosphere. None of the samples were forged. Each specimen to be tested was machined to prepare a 1/8 inch by 1 1/8 inch rubbing surface. The specimens were next successively locked in a fixture of the wear test machine and placed in contact with a rotating smooth-surfaced cast iron wheel having a face width of one inch. Increased wear resistance was measured by decreased weight loss in grams and in decreased volume loss in cubic inches. Score resistance, on the other hand, was indicated by the load required to cause scoring under prescribed test conditions.

A wear test using this apparatus was conducted in which the specimen load was increased to 512 pounds and retained at this figure for a total test period of five hours. At the end of this time the sintered copper base test specimens which did not contain titanium-aluminum particles showed an average weight loss of 0.341 gram, while the copper-base samples containing the titanium-aluminum particles lost an average of only 0.0155 gram. Similarly, while the former specimens underwent a volume loss averaging $269 \times 10^{-5}$ cubic inches, the test specimens formed in accordance with the present invention changed on the average only approximately $2 \times 10^{-5}$ cubic inches. The results of these tests, which show the relatively low weight and low volume loss of our new sintered powdered copper-base bearing material under severe wear test conditions, illustrate its high wear resistance.

These various specimens were also subjected to a score test in which the test samples were placed against the aforementioned rotating wheel for 60 minutes under a 502 pound specimen load, and this load was then increased until scoring occurred. The samples which did not contain titanium-aluminum required a load of only about 590 pounds to produce scoring, but an average load of approximately 791 pounds was required to cause any indication of scoring of the samples containing titanium-aluminum particles. Thus the results of this test indicate that the presence of the titanium-aluminum particles also materially increases the score resistance of sintered powdered copper-base metals.

While the present invention has been described by means of certain specific examples, it is to be understood that the scope of the invention is not to be limited thereby except as defined in the following claims.

We claim:

1. A highly wear-resistant sintered copper base bearing formed from a powder metal mixture consisting essentially of 1% to 18% tin, 2% to 15% nickel, 0.5% to 25% dispersed particles of titanium-aluminum alloy comprising about 30% to 90% titanium and 10% to 70% aluminum, and the balance substantially all a metal powder selected from the class consisting of copper and copper base alloys.

2. A sintered powdered copper base metal bearing consisting essentially of 0.5% to 25% of a titanium-aluminum alloy having a titanium content between about 30% and 90%, 1% to 18% tin, and the balance substantially all a metal selected from a class consisting of copper and copper base alloys.

3. A highly wear-resistant sintered powdered metal bearing formed from a mixture consisting essentially of 0.5% to 25% titanium-aluminum powder of which the titanium and aluminum respectively constitute approximately 30% to 90% and 10% to 70%, 1% to 13% tin powder, a small but effective amount not in excess of about 6.5% carbon, and the balance substantially all a powdered metal selected from the group consisting of copper and copper base alloys.

4. A sintered powdered metal bearing characterized by high wear and score resistance, said bearing being formed from a powdered metal mixture consisting essentially of 1% to 10% titanium-aluminum alloy, carbon not in excess of 6.5%, 1% to 13% tin, 2% to 15% nickel, and the balance substantially all powdered copper, said titanium-aluminum alloy consisting essentially of 30% to 90% titanium and 10% to 70% aluminum.

5. A bearing characterized by oil-retaining properties, high wear resistance and anti-score properties, said bearing formed by briquetting and sintering a powdered metal mixture consisting essentially of 1% to 13% tin powder, 2% to 15% nickel powder, 1% to 10% pulverized titanium-aluminum alloy, 0.3% to 4% carbon, 0.3% to 2% die lubricant, and 70% to 97% copper powder, said titanium-aluminum alloy consisting essentially of 30% to 90% titanium and 10% to 70% aluminum.

References Cited in the file of this patent

UNITED STATES PATENTS

| | | |
|---|---|---|
| 1,551,333 | Schroter | Aug. 25, 1925 |
| 1,661,245 | Williams | Mar. 6, 1928 |
| 1,684,131 | Franks | Sept. 11, 1928 |
| 1,913,373 | De Golyer | June 13, 1933 |
| 2,362,007 | Hensel | Nov. 7, 1944 |
| 2,372,202 | Hensel et al. | Mar. 27, 1945 |
| 2,612,443 | Goetzel | Sept. 30, 1952 |

OTHER REFERENCES

Handbook of Chemistry and Physics, 30th edition, 1947, Chemical Rubber Publishing Co., Cleveland, Ohio, p. 1267.